Figure 3:
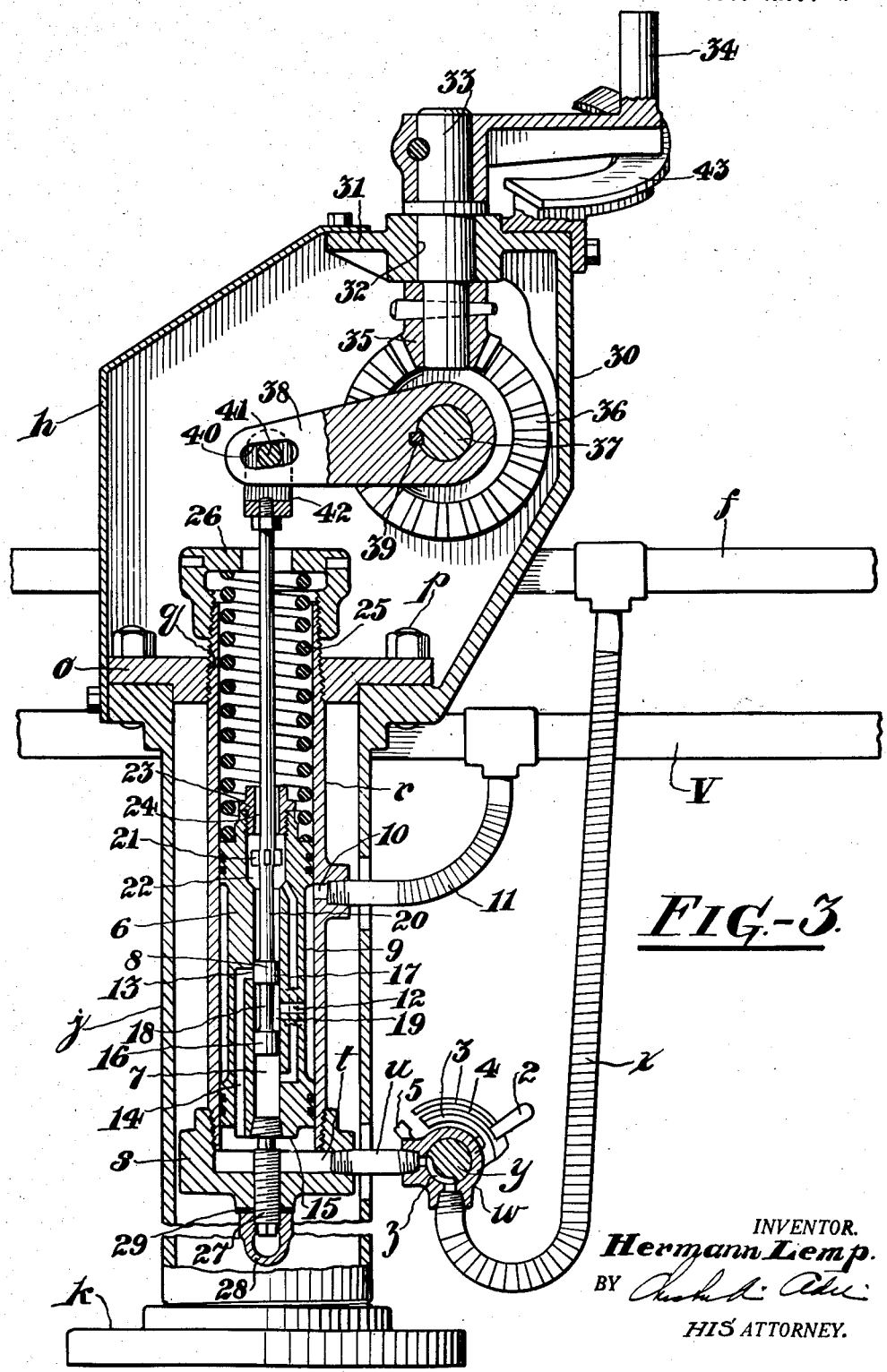

Feb. 7, 1933.  H. LEMP  1,896,633
SPEED CONTROL APPARATUS FOR LOCOMOTIVES
Filed Nov. 29, 1930   2 Sheets-Sheet 1
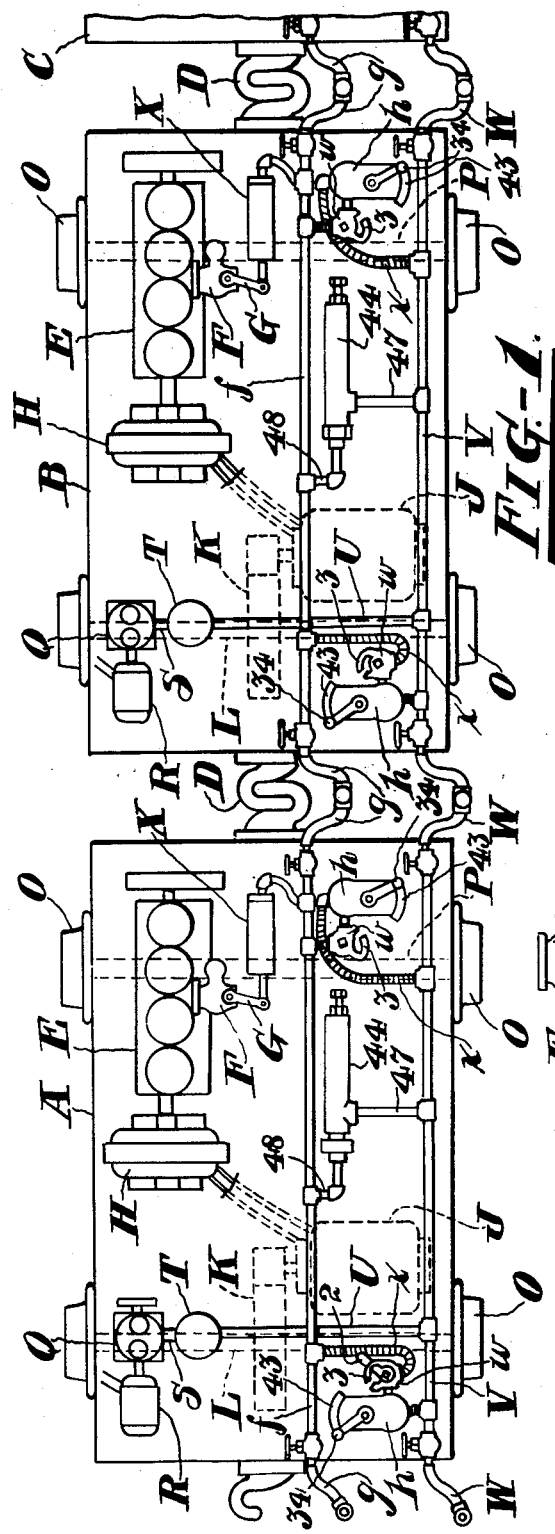
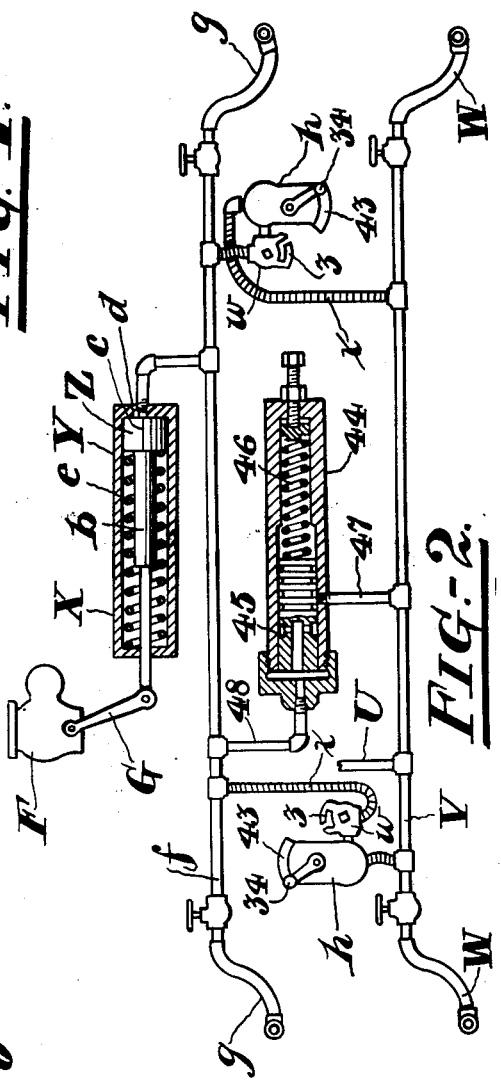
INVENTOR.
Hermann Lemp.
BY
HIS ATTORNEY.

Patented Feb. 7, 1933

1,896,633

UNITED STATES PATENT OFFICE

HERMANN LEMP, OF GLEN ROCK, NEW JERSEY, ASSIGNOR TO INGERSOLL-RAND COMPANY, OF JERSEY CITY, NEW JERSEY, A CORPORATION OF NEW JERSEY

SPEED CONTROL APPARATUS FOR LOCOMOTIVES

Application filed November 29, 1930. Serial No. 498,961.

This invention relates to speed control apparatus, but more particularly to apparatus of this character intended to be used in connection with a prime mover, such as an internal combustion engine, of a locomotive.

One object of the invention is to enable the power controlling devices of a plurality of internal combustion engines to be actuated in synchronism both for accelerating and decelerating the speed of the engines and consequently the speed of the locomotives upon which the engines are mounted.

Another object is to assure such synchronized operation throughout the entire speed range of the various engines.

Still another object is to obtain uniform regulation of the speeds of the engines by means of manually operable control stations of which the control mechanism, such as a valve, may be shifted progressively to an infinite number of controlling positions for accelerating and decelerating the speed of the engines.

Other objects will be in part obvious and in part pointed out hereinafter.

In the drawings accompanying this specification and in which similar reference characters refer to similar parts, Figure 1 is a plan view of a plurality of locomotives connected for synchronized operation and being equipped with controlling devices constructed in accordance with the practice of the invention, Figure 2 is a plan view partly in section of the speed controlling apparatus, and Figure 3 is a sectional elevation of a control station.

Referring more particularly to the drawings and at first to Figure 1, A, B and C designate locomotives which may be identical in all their essential respects and are shown connected to each other by means of coupling devices D.

Each locomotive has mounted thereon a prime mover in the form of an internal combustion engine E equipped with a fuel controlling device or speed governor F, such as a carburetor or centrifugal governor, for controlling the admission of fuel to the engine. The fuel controlling device F is illustrated as having an operating lever G actuated by a pressure responsive governor X to control the quantity of fuel to the engine.

A generator H is connected to be driven by the engine to generate current for driving a main motor J which may be connected, as by means of a gear train K, to an axle L carrying one pair of traction wheels O of which an additional pair is carried by a second axle P of the locomotive.

The locomotives are further provided with suitable compressing units of which each unit consists of a compressor Q and a motor R for driving the compressor and being connected to receive current from the generator H. The air compressed by the compressor Q is discharged through a discharge pipe S into a storage receiver T from whence the pressure fluid may flow through an outlet connection U.

The outlet connection U leads to a supply or service pipe V which extends longitudinally of the locomotive and carries at its ends flexible conduits or hose couplings W to afford communication between the service pipes V of the several locomotives.

In order to assure synchronized operation of the engines E each fuel controlling device F is provided with pressure responsive governing means designated generally by X and comprising a casing Y having therein a plunger Z which carries a reduced stem $b$ having its free end pivotally connected to the lever G. The plunger Z has an enlarged head $c$ for which the casing Y forms a guide, and the head $c$ is provided with a pressure surface $d$ against which pressure fluid may act for actuating the plunger Z and thus also the lever G.

Disposed within the casing Y and seating with one end against the casing and with its other end against the head $c$ is a calibrated spring $e$ to oppose the movement of the plunger in the direction for increasing the fuel supply to the engine E.

The pressure fluid utilized for actuating the plunger Z is conveyed thereto by a conduit $f$, one each of which is mounted on the several locomotives. At the ends of the conduits $f$ are hose couplings or flexible connections *g* to effect communication between the several conduits *f*.

Disposed on each locomotive are a plurality of control stations *h* for controlling the flow of pressure fluid from the service pipe V to the conduit *f*. The control stations *h* are preferably arranged near the ends of the locomotives and comprise a tubular pedestal *j* having a base *k* which may be secured to the locomotive in any convenient manner.

On the top of the pedestal *j* is a plate *o* which may be secured to the pedestal as by means of bolts *p*, and in the plate *o* is a threaded aperture *q* for threaded engagement with a cylinder *r* disposed within the pedestal. At the lower end of the cylinder *r* is a head *s* having a passage *t*, the outer end of which is threaded to accommodate a connection *u* leading to a valve casing *w*. From the valve casing *w* leads a connection, as for instance a flexible hose *x* which is connected at its other end to the conduit *f*. Within the valve casing *w* is a throttle valve *y* of the rotary type having a groove *z* in its periphery to establish communication between the connections *u* and *x*.

The valve *y* has a lever 2 which may be of the type adapted to be readily attached to or disconnected from the valve *y* but preferably only in the closed position of the valve. To this end the casing *w* is provided with a pair of guide fingers 3 spaced to form a slot 4 wherein the lever 2 may move. The free ends of the fingers 3 are so spaced with the casing *w* or, as illustrated, with a lug 5 that the lever 2 may be conveniently removed from the valve *y* when the said valve has been rotated to its closed position, that is, to a position in which communication is cut off between the connections *u* and *x*.

Disposed within the cylinder *r* to reciprocate therein is a valve casing 6 having a valve chamber 7 to accommodate a plunger valve 8. In the outer surface of the valve casing 6 is an annular groove 9 to register with a port 10 in the cylinder *r* in all of the various positions which the casing 6 may assume in the cylinder *r*, and from the port 10 leads a connection 11 which is connected at its opposite end to the service or supply pipe V.

The admission of pressure fluid from the annular groove 9 to the valve chamber 7 is effected through a supply passage 12 in the casing 6. At a point slightly above the supply passage 12 is a port 13 of a passage 14 which extends downwardly through the valve casing 6 to supply pressure fluid to the port *t* and also to the lower end of the valve casing 6 which constitutes an actuating surface 15.

Communication between the supply passage 12 and the port 13 is controlled by the valve 8 which, as shown, is provided with a pair of heads 16 and 17 connected by a stem 18. The stem 18 being smaller than the heads forms an annular passage 19 through which pressure fluid may flow from the supply passage 12 to the port 13. The head 17 of the valve 6 is connected to or forms an integral part of a rod 20 extending upwardly through the cylinder *r* and carrying a plurality of lugs 21 which lie within a recess 22 in the upper end of the casing 6 and wherewith the adjacent end of the valve chamber 7 communicates.

Into the upper end of the valve casing 6 is threaded a cylindrical member 23 to act as a seating surface for the upper ends of the lugs 21. The member 23 has an aperture 24 through which the rod 20 extends and said aperture is of sufficiently larger diameter than the rod to enable the free flow of pressure fluid therethrough.

Seated upon the upper end of the casing 6 is a calibrated spring 25 which bears with its opposite or top end against a cap 26 threaded on the upper end of the cylinder *r*.

To the end that the valve casing 6 may be conveniently adjusted to regulate the tension of the spring 25 a screw 27 is threaded into the head *s* and is provided with a cap screw 28 which acts both as a lock nut and also as a sealing means to prevent the leakage of fluid along the cooperating threads of the screw 27 and the head. Preferably a gasket 29 is interposed between the adjacent surfaces of the nut 28 and the head *s*.

Convenient means are provided for actuating the valve 8. To this end the pedestal *j* is provided with a bracket 30 having at its upper end a lateral extension 31 provided with a bore 32 to receive a shaft 33 carrying a control lever 34. The lower end of the shaft 33 carries a pinion 35 meshing with a gear 36 which may be suitably keyed to a shaft 37 supported by the bracket 30. The shaft 37 also carries a rocker arm 38 which is secured to the shaft as by means of a key 39 and has a slot 40 in its free end to receive a pivot pin 41 carried by a coupling member 42 threaded on the upper end of the rod 20. Preferably a plate in the form of a quadrant 43 is secured to the upper end of the bracket 30 to indicate the range of movement of the lever 34 and therefore of the valve 8.

The apparatus may be provided with means, such as that disclosed in my pending application entitled Speed control apparatus for locomotives, Serial No. 468,525, filed July 17, 1930, now Patent No. 1,838,419 of December 29, 1931, for preventing the operation of the engines E for prolonged periods at the critical speed. This means accordingly comprises a cylinder 44 having therein a reciprocable, ported plunger 45 which is acted upon at one end by a calibrated spring 46.

A pipe 47 leads from the service pipe V to the casing 44 to supply pressure fluid through the ports in the plunger and to the conduit *f* through a pipe 48 leading from the end of the casing 44 to the said conduit $f$. The arrangement is such that when the pressure within the conduit $f$ reaches a value at which the fuel controlling devices are actuated to a position corresponding to the critical speed of the engines, an additional charge of pressure fluid is admitted directly and automatically from the service pipe V to the conduit $f$ to quickly actuate the plungers Z through the critical speed range.

The operation of the device is as follows: Let it be assumed that the service pipes V and the conduits $f$ of the several locomotives are suitably connected in the manner explained and that the engines E are operating at the idling speed. If then it be desired to accelerate the speed of the engines the operator may control the admission of pressure fluid to the conduit $f$ and therefore to the pressure responsive governing means X for accelerating the engines, from any one of the control stations $h$. By supplying the apparatus with only one lever 2 for manipulating the various valves $y$ and, because said lever 2 can only be removed from the valves $y$ in the closed position of the valves, the valve $y$ associated with the control station whereby it is intended to control the performance of the engines may be opened with the full assurance that the remaining valves $y$ are closed.

The lever 34 may then be rotated to raise the valve 8 and place the supply passage 12 in communication with the port 13. Pressure fluid will then flow around the stem 18 of the valve into the passage 14 and through the channels connecting the lower end of the cylinder $r$ with the pressure responsive governors X. The pressure fluid thus admitted will act against the actuating surfaces $d$ of the plungers Z and actuate the fuel admission controlling devices F in the direction necessary for accelerating the engines E.

Upon the admission of pressure fluid into the lower end of the cylinder $r$ such pressure fluid will act against the actuating surface 15 of the casing 6 and raise the said casing against the pressure exerted by the spring 25 until the casing 6 reaches a position in which the head 17 of the valve 8 closes the port 13, thus preventing the further admission of pressure fluid to the pressure responsive devices.

Whenever the exigencies of the work require increased engine speed the lever 34 may be advanced further in the direction required for accelerating the engines and thus again place the supply passage 12 in communication with the passage 14. This operation of the lever 34 may continue indefinitely in the same direction, depending upon the engine speed required, to raise the valve 8 to an infinite number of controlling positions. After each movement of the valve 8 in this direction and therefore upon the admission of increased pressure into the lower end of the cylinder $r$ the valve casing will be actuated upwardly to again cut off communication between the supply passage 12 and the passage 14.

As will be readily observed the total movement of the valve 8 relatively to the casing 6 is limited by the lugs 21 which, when the valve is raised a sufficient distance to establish full communication between the supply passage 12 and the passage 14, will seat against the member 23. In instances where it may be desired to supply an immediate heavy charge of pressure fluid to the pressure responsive devices X the lever 34 may be rotated throughout its entire range of movement and upon the initial consequent movement of the valve 8 full communication will be established between the passages 12 and 14. By continuing rotation of the lever 34 in the same direction the lugs 21 will act against the member 23 and the casing 6 may be manually advanced upwardly against the pressure exerted by the spring 25.

To decelerate the speed of the engines the lever 34 may be rocked in the opposite direction. The head 17 of the valve 8 will then uncover the port 13 and permit pressure fluid to escape through the rear end of the valve chamber 7 and through the recess 22 and the bore 24 in the member 23, thence through the upper end of the cylinder $r$ to the atmosphere. Upon exhausting the pressure fluid from the conduit $f$ the spring 25 will act to depress the casing 6 and again carry said casing to a point where the port 13 will be covered by the valve head 17.

Whenever it is desired to completely exhaust the pressure fluid from the pressure responsive devices the valve 8 may be actuated to its lowermost limiting position. In this position the port 13 will be entirely uncovered to establish full communication between the pressure responsive devices X and the atmosphere.

From the foregoing description it will be apparent that the present invention affords a means for effecting close regulation of the fuel controlling devices. Inasmuch as the pressure used for actuating the several pressure responsive governing devices is of uniform value it therefore follows that all the engines will operate in synchronism at all speeds. Moreover the manually operable means, such as the lever 34, may be actuated progressively in one direction for accelerating the speed of the engines and may likewise be actuated progressively for decelerating, thus eliminating the necessity of constantly shifting the lever 34 in an effort to establish the proper connections between the supply of pressure fluid and the pressure responsive governors as well as for exhausting fluid from the pressure responsive devices. From the foregoing a number of other advantages may be pointed out not the least of which is that with the form of valve and valve cage employed, pressure fluid leakage from the governors X and their associated connections is automatically compensated. Leakage in the governing system reduces the pressure upon the actuating surface of the valve cage so that it is unbalanced by the spring 25, thereby opening the circuit for the admission of additional pressure fluid from the supply line V, until equilibrium is restored.

Another important advantage is that all of the pistons in the control cylinders or governing devices X will come to rest at a position corresponding to the position of the control handle on the quadrant. Whatever the position the control handle is made to assume all the corresponding levers on the fuel controlling means connected thereto will follow suit. By providing a spring tending to move the control handle to the closed throttle position a safety "dead man's grip" is assured. The position of the control handle upon the quadrant will at all times be an accurate indicator of the speed at which the engine is running, a great improvement over control systems in which the controller must be returned to a neutral position as soon as the desired speed has been attained.

Although the invention is shown and described as being applied as a means for actuating the fuel controlling devices of engines located on adjoining locomotives, it will be obvious to those skilled in the art that it is likewise applicable to a plurality of engines grouped on a single locomotive or to engines of locomotives located remotely with respect to each other.

I claim:

1. In a control apparatus for locomotives, the combination of an internal combustion engine and fuel controlling means for the engine, pressure responsive means for actuating the fuel controlling means, a valve for controlling the supply of pressure fluid to the pressure responsive means, and means associated with the valve and moving independently of the valve to maintain a constant pressure in the pressure responsive means.

2. In a control apparatus for locomotives, the combination of an internal combustion engine and fuel controlling means for the engine, pressure responsive means for actuating the fuel controlling means, manually operable valve means shiftable to a variety of positions for admitting pressure fluid to the pressure responsive means, and pressure actuated means adapted to follow the movement of the valve for cutting off the supply of pressure fluid to the pressure responsive means.

3. In a control apparatus for locomotives, the combination of an internal combustion engine and fuel controlling means for the engine, pressure responsive means for actuating the fuel controlling means, a manually operable valve for admitting pressure fluid to the pressure responsive means, and a casing for the valve actuated by pressure fluid for cutting off the flow of pressure fluid to the pressure responsive means.

4. In a control apparatus for locomotives, the combination of an internal combustion engine and fuel controlling means for the engine, pressure responsive means for actuating the fuel controlling means, a valve for admitting pressure fluid to the pressure responsive means, and means actuated by pressure fluid flowing to the pressure responsive means movable relatively to the valve and independently thereof for cutting off the flow of pressure fluid to the said pressure responsive means.

5. In a control apparatus for locomotives, the combination of an internal combustion engine and fuel controlling means for the engine, pressure responsive means for actuating the fuel controlling means, a valve controlling the flow of fluid to and from the pressure responsive means, and means cooperating with the valve and actuated by pressure fluid flowing to the pressure responsive means for cutting off the flow of pressure fluid to and from the pressure responsive means.

6. In a control apparatus for locomotives, the combination of an internal combustion engine and fuel controlling means for the engine, pressure responsive means for actuating the fuel controlling means, a valve shiftable to an infinite number of positions for admitting pressure fluid to the pressure responsive means, and means actuated by pressure fluid flowing to the pressure responsive means to cooperate with the valve in any position of the valve for cutting off the supply of pressure fluid to the pressure responsive means.

7. In a control apparatus for locomotives, the combination of an inernal combustion engine and fuel controlling means for the engine, pressure responsive means for actuating the fuel controlling means, a control cylinder, a valve therein for admitting and exhausting pressure fluid to and from the pressure responsive means, a valve casing in the cylinder and having ports and passages controlled by the valve through which pressure fluid flows to and from the pressure responsive means, said casing being actuated by pressure fluid flowing to the pressure responsive means to follow the valve whereby the ports and passages are controlled, and a spring opposing the pressure fluid acting against the casing.

8. In a control apparatus for locomotives, the combination of an internal combustion engine and a fuel controlling device for the engine, spring opposed pressure responsive means for actuating the fuel controlling device, a valve for admitting and exhausting pressure fluid to and from the pressure responsive means, a floating casing for the valve having admission and exhaust passages controlled by the valve, said casing being actuated by pressure fluid supplied to the pressure responsive means to follow the movement of the valve in one direction and to cooperate with the valve for cutting off the flow of pressure fluid to said pressure responsive means, and a spring for opposing such movement of the casing.

9. In a control apparatus for a plurality of engines intended to be operated in synchronism, individual pressure actuated power control devices on each engine, a conduit affording communication between the devices, a plurality of control stations connected to the conduit and any one of which control stations may serve to control the admission of pressure fluid to and the exhaust from all the devices, said stations each comprising a manually operable valve, a floating casing therefor having ports and passages controlled by the valve and being subjected on one end to pressure fluid supplied to the devices for causing the casing to follow the movement of the valve in one direction, and a spring acting on the other end of the casing to cause the casing to follow the movement of the valve in the opposite direction.

10. In a control apparatus, the combination of a plurality of internal combustion engines and individual fuel controlling means for each engine, individual pressure responsive actuating means for the fuel controlling means, valve means for controlling the flow of pressure fluid to and from the pressure responsive means, and means actuated by pressure fluid flowing to and from the pressure responsive means and subsequently to the movement of the valve means for cutting off the flow of pressure fluid to and from the said pressure responsive means.

11. In a control apparatus, the combination of a plurality of internal combustion engines and fuel controlling means therefor, pressure responsive means for actuating the fuel controlling means, a single valve means for controlling the flow of pressure fluid to and from the pressure responsive means, and pressure actuated means for cutting off the flow of pressure fluid to and from the pressure responsive means.

12. A control system for synchronous operation of a plurality of engines comprising a pressure fluid actuated speed governing device for each engine, a pressure fluid conduit to the governing devices, a master control controlling the flow of pressure fluid into and out of the conduits, and automatic means to stop the flow of pressure fluid when the pressure in the conduit is sufficient to operate the speed governing devices to a position corresponding to the position of the master control.

13. A control system for synchronous operation of a plurality of engines comprising a pressure fluid actuated speed governing device for each engine, a pressure fluid conduit to the governing devices, a master control valve controlling the flow of pressure fluid into and out of the conduits, and automatic means to stop the flow of pressure fluid when the pressure in the conduit is sufficient to operate the speed governing devices to a position corresponding to the position of the master control valve.

14. A control system for synchronous operation of a plurality of engines comprising a pressure fluid actuated speed governing device for each engine, a pressure fluid conduit to the governing devices, a master control controlling the flow of pressure fluid into and out of the conduits, and automatic means cooperating with the control valve to maintain a pressure in the conduit corresponding to the position of the control valve.

15. A control system for synchronous operation of a plurality of engines comprising a pressure fluid actuated speed governing device for each engine, a pressure fluid conduit to the governing devices, a manually operable master control controlling the flow of pressure fluid into and out of the conduits, and automatic means to stop the flow of pressure fluid when the pressure in the conduit is sufficient to operate the speed governing devices to a position corresponding to the position of the master control.

16. A control system for synchronous operation of a plurality of engines comprising a pressure fluid actuated speed governing device for each engine, a pressure fluid conduit to the governing devices, a manually operable master control valve controlling the flow of pressure fluid into and out of the conduits, and automatic means to stop the flow of pressure fluid when the pressure in the conduit is sufficient to operate the speed governing devices to a position corresponding to the position of the master control valve.

17. A control system for synchronous operation of a plurality of engines comprising a pressure fluid actuated speed governing device for each engine, a pressure fluid conduit to the governing devices, a manually operable master control controlling the flow of pressure fluid into and out of the conduits, and automatic means cooperating with the control valve to maintain a pressure in the conduit corresponding to the position of the control valve.

18. A control system for synchronous operation of a plurality of engines comprising a pressure fluid actuated speed governing device for each engine, a pressure fluid conduit to the governing devices, a master control to vary the pressure in the conduit, and automatic means to maintain the pressure in the conduit indicated by the position of the master control.

19. A control system for synchronous operation of a plurality of engines comprising a pressure fluid actuated speed governing device for each engine, a pressure fluid conduit to the governing devices, a master control to vary the pressure in the conduit, and an operating handle for the master control adapted by its postion to apprise the operator of the engine speed.

In testimony whereof I have signed this specification.

HERMANN LEMP.